United States Patent
Kitagawa et al.

(10) Patent No.: US 9,680,149 B2
(45) Date of Patent: Jun. 13, 2017

(54) ELECTRODE MATERIAL, PASTE FOR ELECTRODES, AND LITHIUM ION BATTERY

(71) Applicant: SUMITOMO OSAKA CEMENT CO., LTD., Tokyo (JP)

(72) Inventors: Takao Kitagawa, Furnabashi (JP); Hiroyuki Mine, Hiroshima (JP); Hirofumi Yasumiishi, Yachiyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 14/718,725

(22) Filed: May 21, 2015

(65) Prior Publication Data

US 2015/0380734 A1 Dec. 31, 2015

(30) Foreign Application Priority Data

Jun. 27, 2014 (JP) ................. 2014-133178

(51) Int. Cl.
| | |
|---|---|
| *H01M 4/36* | (2006.01) |
| *H01M 10/0525* | (2010.01) |
| *H01M 4/587* | (2010.01) |
| *H01M 4/133* | (2010.01) |
| *H01M 4/04* | (2006.01) |
| *H01M 4/136* | (2010.01) |
| *H01M 4/58* | (2010.01) |
| *H01M 4/62* | (2006.01) |

(52) U.S. Cl.
CPC ......... *H01M 4/366* (2013.01); *H01M 4/0471* (2013.01); *H01M 4/136* (2013.01); *H01M 4/5825* (2013.01); *H01M 4/625* (2013.01); *H01M 10/0525* (2013.01)

(58) Field of Classification Search
CPC ........... H01M 10/0525; H01M 4/0471; H01M 4/136; H01M 4/366; H01M 4/5825; H01M 4/625

See application file for complete search history.

(56) References Cited

U.S. PATENT DOCUMENTS

| | | | |
|---|---|---|---|
| 2011/0163272 A1* | 7/2011 | Ono ................ | H01M 4/0416 252/500 |
| 2012/0034522 A1 | 2/2012 | Sheem et al. | |
| 2012/0286439 A1 | 11/2012 | Tsumori et al. | |
| 2012/0308894 A1 | 12/2012 | Oguni et al. | |
| 2014/0356716 A1* | 12/2014 | Kitagawa ........ | H01M 4/485 429/221 |
| 2015/0380725 A1* | 12/2015 | Mine .............. | H01M 4/366 429/231.8 |

FOREIGN PATENT DOCUMENTS

| | | | |
|---|---|---|---|
| EP | 2760069 A1 | 7/2014 | |
| EP | 2811560 | 12/2014 | |
| JP | 2001015111 A | 1/2001 | |
| JP | 2008311067 | 12/2008 | |
| JP | 2012204150 | 10/2012 | |
| JP | WO 2013042538 A1 * | 3/2013 | ............ H01M 4/485 |
| JP | 2013-069564 A | 4/2013 | |
| JP | 2013-182689 A | 9/2013 | |
| JP | 2014060142 | 4/2014 | |
| WO | 2014/030691 A | 2/2014 | |

OTHER PUBLICATIONS

Chien-Te Hsieh, I-Ling Chen, Wei-Yu Chen, Jung-Pin Wang. Synthesis of iron phosphate powders by chemical precipitation route for high-power lithium iron phosphate cathodes, Electrochimica Acta 83 (2012) 202-208.*

B. Huang, X. Zheng, X. Fan, G. Song, M. Lu. Enhanced rate performance of nano-micro structured LiFePO4/C by improved process for high-power Li-ion batteries, Electrochimica Acta 56 (2011) 4865-4868.*

European Search Report mailed Sep. 24, 2015, for European Application No. 15000552.8; 14 pages, (copending U.S. Appl. No. 14/634,353).

Office Action of U.S. Appl. No. 14/634,353 dated Oct. 14, 2015.
Final Office Action of U.S. Appl. No. 14/634,353 dated Feb. 3, 2016.
Office Action of U.S. Appl. No. 14/634,353 dated Jul. 28, 2016.
Final Office Action of U.S. Appl. No. 14/634,353 dated Sep. 12, 2016.

\* cited by examiner

*Primary Examiner* — Carlos Barcena

(74) *Attorney, Agent, or Firm* — Fitch, Even, Tabin & Flannery, LLP

(57) ABSTRACT

An electrode material includes an electrode active material having a carbonaceous film formed on a surface is used and which is capable of suppressing voltage drop when high-speed charge and discharge is carried out in a low-temperature environment.

The electrode material has a particulate shape and is formed a carbonaceous film on surfaces of electrode active material particles. An average of discharge capacity ratios between a 35C discharge capacity at −10° C. of a single particle of the electrode material and a 1C discharge capacity at −10° C. of a single particle of the electrode material is 0.50 or more.

20 Claims, 2 Drawing Sheets

US 9,680,149 B2

ELECTRODE MATERIAL, PASTE FOR ELECTRODES, AND LITHIUM ION BATTERY

TECHNICAL FIELD

The present invention relates to an electrode material, paste for electrodes, and a lithium ion battery.

BACKGROUND ART

In recent years, as a battery anticipated to have a small size, a light weight, and high capacity, a non-aqueous electrolytic solution-based secondary battery such as a lithium ion battery has been proposed and put into practical use. The lithium ion battery is configured to have a positive electrode and a negative electrode which have properties capable of reversibly intercalating and deintercalating lithium ions, and a non-aqueous electrolyte.

As a negative electrode active material for negative electrode materials of the lithium ion battery, a carbon-based material, lithium titanate ($Li_4Ti_5O_{12}$), or the like is used.

On the other hand, as a positive electrode active material for positive electrode materials of the lithium ion battery, a lithium-containing metal oxide such as lithium cobaltate ($LiCoO_2$), a lithium oxoacid salt-based compound such as lithium iron phosphate ($LiFePO_4$), or the like is used.

Compared with secondary batteries of the related art such as lead batteries, nickel-cadmium batteries, and nickel-hydrogen batteries, the lithium ion batteries have a lighter weight, a smaller size, and higher energy. Therefore, the lithium ion batteries are used not only as small-size power supplies used in portable electronic devices such as mobile phones and notebook personal computers but also as large-size stationary emergency power supplies.

In addition, recently, studies have been underway regarding the use of lithium ion batteries as high-output power supplies for plug-in hybrid vehicles, hybrid vehicles, industrial device, electric power tools, and the like. Since batteries used as the above-described high-output power supplies are frequently used in applications that are expected to be used outdoors, the batteries are required to have high-speed charge and discharge characteristics not only at room temperature but also at a low temperature in a case in which the batteries are expected to be used in cold areas.

Among the electrode active materials, the lithium oxoacid salt-based compound (particularly, lithium iron phosphate) is attracting attention due to the excellent safety and the absence of problems with its resource and cost. However, the lithium oxoacid salt-based compound has a problem with low electron conductivity due to its crystal structure (olivine-type crystal structure).

Therefore, in order to increase the electron conductivity of an electrode material for which the lithium oxoacid salt-based compound is used as an electrode active material, means of Patent Document 1 has been proposed. In Patent Document 1, particle surfaces of an electrode active material made of lithium iron phosphate are covered with an organic compound that is a carbon source, then, the organic compound is carbonized so as to form a carbonaceous film on the surface of the electrode active material, and carbon in the carbonaceous film is made to act as an electron conductive substance.

RELATED ART DOCUMENT

Patent Document

[Patent Document 1] Japanese Laid-open Patent Publication No. 2001-15111

DISCLOSURE OF THE INVENTION

Problem that the Invention is to Solve

However, the carbonaceous film acts as a hindrance to the redox reaction of lithium ions, and also hinders the diffusion of lithium ions. Therefore, as the coating proportion by the carbonaceous film increases, and as the film thickness of the carbonaceous film increases, the conductivity of lithium ions is impaired. Therefore, the improvement of electron conductivity and the improvement of lithium ion conductivity have a trade-off relationship with each other. For example, in an electrode active material in which a carbonaceous film is supported, the electron conductivity improves, but the lithium ion conductivity is impaired, and thus the sum of the internal resistance of an electrode increases, and the voltage significantly drops when high-speed discharge is carried out. Particularly, the voltage tends to drop significantly during high-speed discharge in a low-temperature environment.

An object of the present invention is to provide an electrode material in which an electrode active material having a carbonaceous film formed on the surface is used and which is capable of suppressing voltage drop when high-speed discharge is carried out in a low-temperature environment, paste for electrodes, and a lithium ion battery.

Means for Solving the Problem

To solve the above-described problems, the present invention provides the following inventions [1] to [9].

[1] An electrode material, in which the electrode material have a particulate shape, the electrode material is formed a carbonaceous film on surfaces of electrode active material particles, and an average of discharge capacity ratios between a 35C discharge capacity at −10° C. of a single particle of the electrode material and a 1C discharge capacity at −10° C. of a single particle of the electrode material is 0.50 or more.

[2] The electrode material according to [1], in which a inflection ratio of a lithium ion migration path in the carbonaceous film is in a range of 1.1 to 100.

[3] The electrode material according to [1] or [2], in which the electrode active material particles have an olivine-type crystal structure.

[4] The electrode material according to any one of [1] to [3], in which a content rate of the carbonaceous film with respect to a total mass of the electrode material is in a range of 0.5% by mass to 5.0% by mass.

[5] The electrode material according to any one of [1] to [4], in which a powder resistance value of the electrode material is 300 Ω·cm or less.

[6] The electrode material according to any one of [1] to [5], in which a ratio between a powder resistance value (Ω·cm) of the electrode active material particles and a content rate (% by mass) of the carbonaceous film is 300 or less.

[7] The electrode material according to any one of [1] to [6], in which the electrode material is produced by the following steps (1) and (2), (1) a slurry preparation step of preparing a slurry including the electrode active material particles and/or a precursor of the electrode active material particles, an organic compound i, and an organic compound ii, and (2) a step of drying the slurry so as to generate a granulated body having a film including the organic compounds i and ii on a surface, firing the granulated body in a non-oxidative atmosphere so as to remove the organic compound ii from the film and carbonize the organic compound i, thereby forming a carbonaceous film made of a carbonaceous material coming from the organic compound i on the surface of the granulated body.

[8] Paste for electrodes including the electrode material according to any one of [1] to [7] and a binding agent.

[9] A lithium ion battery including a positive electrode collector having an electrode material layer formed of the paste for electrodes according to [8] on a metal foil.

In the present invention, the average of the discharge capacity ratios between the 35C discharge capacity at −10° C. of a single particle of the electrode material and the 1C discharge capacity at −10° C. of a single particle of the electrode material refers to the average value of the discharge capacity ratios of 100 single particles of the electrode material.

In the present invention, 35C, 35C discharge capacity, 1C, and 1C discharge capacity are defined as described below.

When a discharge capacity (nAh) obtained when the electrode material is constant-current-charged at 0.1 nA up to an appropriate potential of the electrode material so as to be in the full charge state, and then is discharged, similarly, at 0.1 nA to 2.0 V is considered as the maximum discharge capacity, the discharge speed obtained when a current value at which the maximum discharge capacity is fully discharged in 1/35 hours is applied to the electrode material is defined as 35C. The 35C discharge capacity refers to a discharge capacity obtained when the electrode material is discharged from the full charge state to 2.0 V at the discharge speed 35C.

When a discharge capacity (nAh) obtained when the electrode material is constant-current-charged at 0.1 nA up to an appropriate potential of the electrode material so as to be in the full charge state, and then is discharged, similarly, at 0.1 nA to 2.0 V is considered as the maximum discharge capacity, the discharge speed obtained when a current value at which the maximum discharge capacity is fully discharged in 1 hour is applied to the electrode material is defined as 1C. The discharge capacity refers to a discharge capacity obtained when the electrode material is discharged from the full charge state to 2.0 V at the discharge speed 1C.

Hereinafter, "the discharge capacity ratio between the 35C discharge capacity at X° C. of a single particle of the electrode material and the 1C discharge capacity at X° C. of a single particle of the electrode material" will be referred to as "the discharge capacity ratio at X° C." or "35C/1C at X° C." in some cases. For example, there are cases in which "the discharge capacity ratio between the 35C discharge capacity at −10° C. of a single particle of the electrode material and the 1C discharge capacity at −10° C. of a single particle of the electrode material" will be referred to as "the discharge capacity ratio at −10° C." or "35C/1C at −10° C.".

In addition, hereinafter, "the content rate of the carbonaceous film with respect to the total mass of the electrode material" will be referred to as "the amount of carbon in the electrode material" in some cases.

Advantage of the Invention

The electrode material, the electrode, and the lithium ion battery of the present invention are capable of suppressing voltage drop when high-speed discharge is carried out in a low-temperature environment regardless of the use of an electrode active material having a carbonaceous film formed on the surface.

BEST MODE FOR CARRYING OUT THE INVENTION

Electrode Material

Figure 1A:
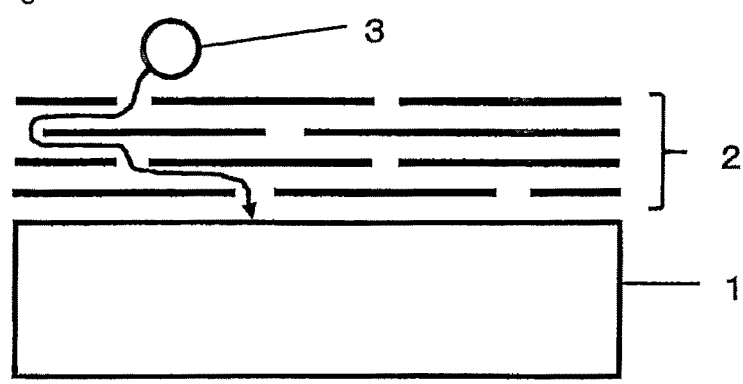
FIGS. 1A and 1B are imaginary views illustrating a migration path of a lithium ion in a carbonaceous film in an electrode material.

An electrode material of the present invention have a particulate shape, the electrode material the electrode material is formed a carbonaceous film on surfaces of electrode active material particles, and the average of the discharge capacity ratios between the 35C discharge capacity at −10° C. of a single particle of the electrode material and the 1C discharge capacity at −10° C. of a single particle of the electrode material is 0.50 or more.

In the present invention, when an electrode material satisfying the above-described requirements is used, it is possible to suppress voltage drop during high-speed discharge in a low-temperature environment.

Properties of Electrode Material

As the electrode material of the present invention, an electrode material having a discharge capacity ratio at −10° C. (35C/1C at −10° C.) of 0.50 or more is used. When the discharge capacity ratio at −10° C. is set to 0.50 or more, it is possible to suppress voltage drop during high-speed discharge in a low-temperature environment.

The discharge capacity ratio at −10° C. is preferably 0.55 or more, more preferably 0.60 or more, and still more preferably 0.65 or more. Meanwhile, the discharge capacity ratio at −10° C. is preferably 0.80 or less, and more preferably 0.75 or less.

The discharge capacity of a single particle of the electrode material can be obtained by extracting a single particle from the electrode material, and measuring the discharge capacity of the single particle using a micro electrode. Specifically, the discharge capacity can be measured using a method described in examples.

In the electrode material of the present invention, the 35C/1C at 20° C. of a single particle of the electrode material is preferably 0.60 or more, more preferably 0.65 or more, and still more preferably in a range of 0.65 to 0.90.

In the electrode material of the present invention, from the viewpoint of improving the electron conductivity, the powder resistance value is preferably 300 Ω·cm or less, more preferably 250 Ω·cm or less, still more preferably 230 Ω·cm or less, and far still more preferably in a range of 100 Ω·cm to 220 Ω·cm.

The powder resistance value can be measured from a specimen obtained by molding the electrode material at a pressure of 50 MPa, and specifically, the powder resistance value can be measured using a method described in the examples.

In the electrode material of the present invention, the ratio between the powder resistance value (Ω·cm) and the amount (% by mass) of carbon in the electrode material is preferably 300 or less, more preferably 250 or less, and still more preferably in a range of 1 to 230. It is known that, in an electrode material satisfying the above-described requirement, the amount of carbon necessary to increase the electron conductivity is small, both the electron conductivity and the lithium ion conductivity are satisfied, and the problem of the trade-off relationship can be solved.

Electrode Active Material Particles

Examples of an electrode active material constituting the electrode active material particles include lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

The electrode active material particles preferably include at least one selected from a group consisting of lithium cobaltate, lithium nickelate, lithium manganate, lithium titanate, and $Li_xA_yD_zPO_4$ as a main component, and among them, lithium oxoacid salt-based compounds represented by $Li_xA_yD_zPO_4$ are preferred since the compounds have an olivine-type crystal structure, voltage drop is likely to occur when high-speed discharge is carried out in a low-temperature environment, and the compounds readily exhibit the effects of the constitution of the present invention.

Here, the main component refers to a component having a content in the total mass of the electrode active material particles of more than 50% by mass. In addition, the content of the main component is more preferably 80% by mass or more, and still more preferably 90% by mass or more in the total mass of the electrode active material particles.

A in $Li_xA_yD_zPO_4$ is preferably Co, Mn, Ni, or Fe since it is easy to obtain a high discharge potential. D in $Li_xA_yD_zPO_4$ is preferably Mg, Ca, Sr, Ba, Ti, Zn, or Al since it is easy to obtain a high discharge potential.

In addition, the rare earth elements refer to 15 elements of La, Ce, Pr, Nd, Pm, Sm, Eu, Gd, Tb, Dy, Ho, Er, Tm, Yb, and Lu which belong to the lanthanum series.

Among them, the electrode active material is preferably $Li_xFe_yD_zPO_4$ (A is Fe), more preferably $Li_xFe_yPO_4$ (A is Fe, and z is 0), and still more preferably $LiFePO_4$.

As the lithium oxoacid salt-based compound (olivine-type lithium-based compound) represented by $Li_xA_yD_zPO_4$, it is possible to use a compound manufactured using a method of the related art such as a solid phase method, a liquid phase method, or a gas phase method.

$Li_xA_yD_zPO_4$ can be obtained by, for example, hydrothermally synthesizing a slurry-form mixture obtained by mixing a Li source, an A source, a P source, water, and, if necessary, a D source, washing the obtained sediment using water so as to generate a precursor substance of the electrode active material, and furthermore firing the precursor substance. During the hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like, and it is preferable to use at least one selected from a group consisting of lithium acetate, lithium chloride, and lithium hydroxide.

Examples of the A source include chlorides, carboxylate salts, hydrosulfate, and the like which include at least one selected from a group consisting of Co, Mn, Ni, Fe, Cu, and Cr. For example, in a case in which A is Fe, examples of a Fe source include divalent iron salts such as iron (II) chloride ($FeCl_2$), iron (II) acetate ($Fe(CH_3COO)_2$), and iron (II) sulfate ($FeSO_4$), and it is preferable to use at least one selected from a group consisting of iron (II) chloride, iron (II) acetate, and iron (II) sulfate.

Examples of the D source include chlorides, carboxylate salts, hydrosulfate, and the like which include at least one selected from a group consisting of Mg, Ca, S, Sr, Ba, Ti, Zn, B, Al, Ga, In, Si, Ge, Sc, Y, and rare earth elements.

Examples of the P source include phosphoric acid compounds such as phosphoric acid ($H_3PO_4$), ammonium dihydrogen phosphate ($NH_4H_2PO_4$), and diammonium hydrogen phosphate (($NH_4)_2HPO_4$), and it is preferable to use at least one selected from a group consisting of phosphoric acid, ammonium dihydrogen phosphate, and diammonium hydrogen phosphate.

The size of the electrode active material particle is not particularly limited, and the average particle diameter of the primary particles is preferably in a range of 10 nm to 20,000 nm, and more preferably in a range of 20 nm to 5,000 nm.

When the average particle diameter of the primary particles of the electrode active material particles is 10 nm or more, it becomes possible to sufficiently coat the surfaces of the primary particles with the carbonaceous film, a decrease in the discharge capacity at a high-speed charge and discharge rate is suppressed, and it is possible to facilitate the realization of sufficient charge and discharge rate performance. In addition, when the average particle diameter of the primary particles of the electrode active material particles is 20,000 nm or less, the internal resistance of the primary particles does not easily become high, and the discharge capacity at a high-speed charge and discharge rate is not easily impaired.

In the present invention, the average particle diameter refers to the particle diameter D50 at which the cumulative volume percentage reaches 50% in the particle size distribution.

The average particle diameter of the primary particles of the electrode active material particles can be obtained by randomly selecting 500 particles, measuring the primary particle diameters of the respective particles using a scanning electron microscope, and calculating the particle diameter at a cumulative volume percentage of 50%. In a case in which the particles are not spherical, the average of the length (long diameter) of the longest line segment among line segments longitudinally traversing the particles and the length (short diameter) of a line segment orthogonally passes through the center point of the long diameter among the line segments longitudinally traversing the particles is used as the primary particle diameter of the respective particles.

The shape of the electrode active material particle is not particularly limited, but is preferably spherical, particularly, truly spherical. When the electrode active material particles are spherical, it is possible to reduce the amount of the solvent when paste for positive electrodes is prepared using the electrode material of the present invention, and it becomes easy to apply the paste for positive electrodes to a collector. The paste for positive electrodes can be prepared by, for example, mixing the electrode material of the present invention, a binder resin (binding agent), and a solvent together.

In addition, when the shapes of the electrode active material particles are spherical, the surface area of the electrode active material particles is minimized, it is possible to set the blending amount of the binder resin (binding agent) added to the electrode material to the minimum amount, and it is possible to decrease the internal resistance of the obtained positive electrode, which is preferable.

Furthermore, when the shapes of the electrode active material particles are spherical, it is easy to closely pack the electrode active material, and thus the amount of a positive electrode material loaded per unit volume increases, and thus it is possible to increase the electrode density. As a result, it is possible to increase the capacity of the lithium ion battery, which is preferable.

The electrode active material particles may be agglomerated particles that are an agglomerate of the primary particles. The average particle diameter (average secondary particle diameter) of the agglomerated particles is preferably in a range of 0.5 μm to 100.0 μm, and more preferably in a range of 1.0 μm to 50.0 μm. When the average particle diameter of the agglomerated particles is set to 0.5 μm or more, it is possible to easily prevent a decrease in the discharge capacity at a high-speed charge and discharge rate. In addition, when the average particle diameter of the agglomerated particles is set to 100 μm or less, a decrease in the discharge capacity which was triggered by the locally generated charge and discharge routes during high-speed charge and discharge made with uneven positive electrode surface caused by the agglomerate, is easily prevented.

Meanwhile, the average particle diameter of the agglomerated particles (average secondary particle diameter) refers to the particle diameter D50 at which the cumulative volume percentage reaches 50% in the particle size distribution, and can be measured using a laser scattering method.

Carbonaceous Film

The carbonaceous film plays a role of imparting desired electron conductivity to the electrode material, but also serves as a hindrance to the redox reaction of lithium ions, and hinders the diffusion of lithium ions. Therefore, as the coating proportion by the carbonaceous film increases, and as the film thickness of the carbonaceous film increases, the conductivity of lithium ions is impaired. Therefore, the improvement of electron conductivity and the improvement of lithium ion conductivity have a trade-off relationship with each other. For example, in an electrode active material in which a carbonaceous film is supported, the electron conductivity improves, but the lithium ion conductivity is impaired, and thus the sum of the internal resistance of an electrode increases, and the voltage significantly drops when high-speed discharge is carried out. Particularly, the voltage tends to drop significantly during high-speed discharge in a low-temperature environment.

In the present invention, when the discharge capacity ratio at −10° C. of the electrode material is set to 0.5 or more, the problem of the trade-off relationship can be solved.

The carbonaceous film is obtained by carbonizing an organic compound that serves as a raw material for the carbonaceous film. The organic compound that serves as a raw material for the carbonaceous film and means for forming the carbonaceous film will be described in detail.

In the carbonaceous film, in order to set the discharge capacity ratio at −10° C. of the electrode material to 0.5 or more, the inflection ratio of the migration path of lithium ions is preferably decreased.

In a case in which a structure that causes a hindrance to the migration of lithium ions in the carbonaceous film is present, lithium ions bypass the structure, and migrate. The inflection ratio of the migration path of lithium ions (hereinafter, in some cases, referred to as "inflection ratio") refers to a value obtained by dividing the average migration distance of lithium ions that bypass the structure in the carbonaceous film and migrate by the thickness of the carbonaceous film, and is a dimensionless value. Examples of the structure include structures in which electrons are delocalized such as a hexagonal net surface of carbon.

Figure 1B:
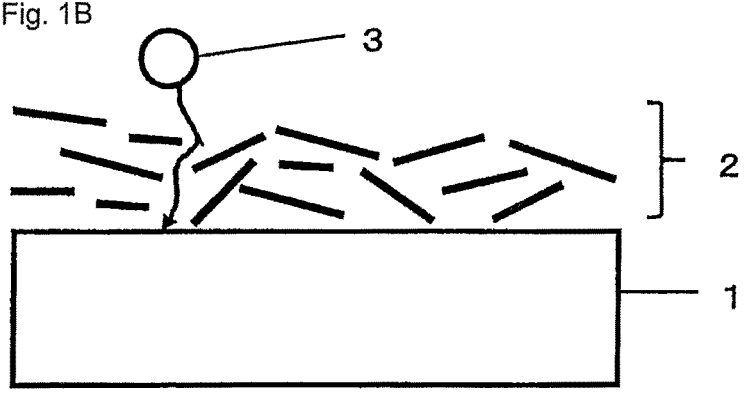

FIGS. 1A and 1B are imaginary views illustrating the migration path of a lithium ion in the carbonaceous film. As illustrated in FIG. 1A, in a case in which graphene layers forming the carbonaceous film are densely disposed, the migration path of lithium ions becomes long. On the other hand, as illustrated in FIG. 1B, in a case in which the graphene layers forming the carbonaceous film are disposed at certain intervals, the migration path of lithium ions becomes short.

The inflection ratio of the carbonaceous film is preferably in a range of 1.1 to 100, more preferably in a range of 1.3 to 50, and still more preferably in a range of 1.5 to 10.

The average value of the inflection ratios of 10 single particles of the electrode material is used as the inflection ratio of the carbonaceous film. In addition, the inflection ratio of the single particle of an electrode material is obtained by measuring the inflection ratios at 10 arbitrary positions of the carbonaceous film on the surface of the electrode material, and obtaining the average value of the inflection ratios of the 10 positions. Specifically, the inflection ratio of the carbonaceous film can be calculated using a method described in the examples.

In the carbonaceous film, in order to set the discharge capacity ratio at −10° C. of the electrode material to 0.5 or more, the average of the plane intervals between (002) planes in the graphene layers is preferably 0.3466 nm or more, and more preferably in a range of 0.350 nm to 0.370 nm. As illustrated in FIG. 1A, in a case in which the graphene layers constituting the carbonaceous film are laminated in an orderly manner, the intervals between the graphene layers become short, and as illustrated in FIG. 1B, in a case in which the graphene layers constituting the carbonaceous film are laminated in a random manner, the intervals between the graphene layers become long.

The average of the plane intervals between the (002) planes of the graphene layers can be measured using a method described in the examples.

In the carbonaceous film, in order to set the discharge capacity ratio at −10° C. of the electrode material to 0.5 or more, the XRD (CuKα ray source) peak of the (002) plane derived from the graphene layer in the carbonaceous film is preferably $2\theta=25.7°$ or less, and more preferably $2\theta=25.4°$ to 24.0°. As illustrated in FIG. 1A, in a case in which the graphene layers constituting the carbonaceous film are laminated in an orderly manner, the XRD (CuKα ray source) peak of the (002) plane derived from the graphene layer appears almost at 26° derived from graphene. On the other hand, as illustrated in FIG. 1B, in a case in which the graphene layers constituting the carbonaceous film are laminated in a random manner, the XRD (CuKα ray source) peak of the (002) plane derived from the graphene layer appears at an angle lower than 26° derived from graphene.

The XRD (CuKα ray source) peak of the (002) plane derived from the graphene layer in the carbonaceous film can be measured using a method described in the examples.

In the present invention, when the lamination states of the graphene layers in the carbonaceous film on the electrode active material particles having the olivine-type crystal structure are compared on a (001) plane, a (010) plane, and a (100) plane of the olivine-type crystal structure, the lamination state on the (010) plane is preferably most random.

In the electrode active material particles having the olivine-type crystal structure, lithium ions can be intercalated and deintercalated only through the (010) plane, and thus the structure of the carbonaceous film on the (010) plane becomes important. Lithium ions are not intercalated and deintercalated through the (001) plane or the (100) plane.

The thickness of the carbonaceous film is preferably in a range of 0.5 nm to 20 nm, more preferably in a range of 1 nm to 10 nm, and still more preferably in a range of 1 nm to 5 nm.

When the thickness of the carbonaceous film is 0.5 nm or more, the sum of the migration resistances of electrons in the carbonaceous film does not easily become high, an increase in the internal resistance of the battery is suppressed, and it is possible to facilitate the prevention of voltage drop at a high-speed charge and discharge rate. When the thickness of the carbonaceous film is 20 nm or less, the steric hindrance is suppressed when lithium ions diffuse in the carbonaceous film, and the migration resistance of lithium ions becomes small, and consequently, an increase in the internal resistance of the battery is suppressed, and it is possible to facilitate the prevention of voltage drop at a high-speed charge and discharge rate.

The average value of the thicknesses of the carbonaceous films in 10 single particles of the electrode material is used as the thickness of the carbonaceous film. In addition, the thickness of the carbonaceous film in a single particle of the electrode material is obtained by measuring the thicknesses at 10 arbitrary positions of the carbonaceous film on the surface of the electrode material, and obtaining the average value of the thicknesses of the positions. Specifically, the thickness of the carbonaceous film can be calculated using a method described in the examples.

The coating proportion of the surface of the electrode material with the carbonaceous film is preferably 50% or more, more preferably 80% or more, and still more preferably 90% or more. When the coating proportion by the carbonaceous film is set to 50% or more, it is possible to facilitate a decrease in the resistance of the electrode material by increasing the electron conductivity of the electrode material, and consequently, it is possible to facilitate an increase in the discharge capacity at a high-speed charge and discharge rate.

The coating proportion can be calculated using a method described in the examples.

The content rate of the carbonaceous film with respect to the total mass of the electrode material (the amount of carbon in the electrode material) is preferably in a range of 0.5% by mass to 5.0% by mass, more preferably in a range of 0.6% by mass to 4.0% by mass, still more preferably in a range of 0.7% by mass to 2.5% by mass, and far still more preferably in a range of 0.8% by mass to 1.5% by mass.

When the amount of carbon in the electrode material is set to 0.5% by mass or more, it is possible to facilitate a decrease in the resistance of the electrode material by increasing the electron conductivity of the electrode material, and consequently, it is possible to facilitate an increase in the discharge capacity at a high-speed charge and discharge rate. In addition, when the content rate of the carbonaceous film is set to 5.0% by mass or less, the mass proportion of the electrode active material in the carbonaceous film is maintained, and it is possible to facilitate the maintenance of the characteristics of the electrode active material.

The amount of carbon in the electrode material can be calculated using a method described in the examples.

The organic compound that serves as a raw material for the carbonaceous film is not particularly limited as long as the compound is capable of forming the carbonaceous film on the surfaces of the electrode active material particles, and examples thereof include polyvinyl alcohol (PVA), polyvinyl pyrrolidone, cellulose such as methyl cellulose and ethyl cellulose, starch, gelatin, hyaluronic acid, sugars such as grape sugar (D-glucose), fruit sugar (D-fructose), sucrose, and lactose, higher monovalent alcohols such as hexanol and octanol, unsaturated monovalent alcohols such as allyl alcohols, propynol (propargyl alcohol), and terpineol, polyvinyl acetate, polyethers, and the like.

The carbonaceous film can be formed on the surface of the electrode active material particles through the following steps (1) and (2). In other words, the electrode material of the present invention can be manufactured through the following steps (1) and (2):

(1) a slurry preparation step of preparing a slurry including the electrode active material particles and/or a precursor of the electrode active material particles, and the organic compound, and (2) a step of drying the slurry so as to generate a granulated body having a film including the organic compound on a surface, firing the granulated body in a non-oxidative atmosphere so as to carbonize the organic compound, thereby forming a carbonaceous film made of a carbonaceous material coming from the organic compound on the surface of the granulated body.

In Step (1), a solvent such as water is preferably further added to the slurry.

The organic compound is preferably used so that the amount of carbon in the organic compound reaches a predetermined amount with respect to the electrode active material particles and/or the precursor of the electrode active material particles. Specifically, the organic compound is blended so that the amount of carbon in the organic compound preferably falls in a range of 0.6 parts by mass to 8.0 parts by mass, and more preferably falls in a range of 1.1 parts by mass to 4.0 parts by mass with respect to a total of 100 parts by mass of the electrode active material particles and/or the precursor of the electrode active material particles.

When the blending ratio of the organic compound in terms of the amount of carbon is 0.6 parts by mass or more, the discharge capacity at a high-speed charge and discharge rate does not easily become low in a case in which a battery is formed, and it is possible to realize sufficient charge and discharge rate performance. When the blending ratio of the organic compound in terms of the amount of carbon is 8.0 parts by mass or less, the steric hindrance is small when lithium ions diffuse in the carbonaceous film, and the lithium ion migration resistance becomes small. As a result, the internal resistance of the battery does not easily increase in a case in which a battery is formed, and it is possible to suppress voltage drop at a high-speed charge and discharge rate.

When the slurry is prepared, it is preferable to dissolve or disperse the electrode active material particles and/or the precursor of the electrode active material particles and the organic compound in water. During the dissolution or dispersion, a dispersant is preferably added, and a dispersion apparatus such as a planetary ball mill, an oscillation ball mill, a bead mill, a paint shaker, or an attritor is preferably used.

During the dissolution or dispersion, it is preferable to disperse in water the electrode active material particles and/or the precursor of the electrode active material particles in a primary particle form, and then add and stir the organic compound so as to be dissolved. Therefore, it is possible to facilitate the coating of the surfaces of the primary particles of the electrode active material particles with the organic compound.

In Step (2), a step in which the slurry prepared in Step (1) is dried so as to generate a granulated body having a film including the organic compound on the surface, the granulated body is fired in a non-oxidative atmosphere so as to carbonize the organic compound, thereby forming a carbonaceous film made of a carbonaceous material coming from the organic compound on the surface of the granulated body is carried out. The granulated body generally has a form of agglomerated particles that are an agglomerate of the primary particles of the electrode active material particles. The precursor of the electrode active material particles turns into electrode active material particles when fired.

Examples of means for generating the granulated body by drying the slurry include means for spraying the slurry in a high-temperature atmosphere. Here, the high-temperature atmosphere refers to an atmosphere at, for example, approximately 70° C. to 250° C.

The non-oxidative atmosphere is preferably an inert atmosphere in which an inert gas such as nitrogen ($N_2$), argon (Ar), or the like is used, and in a case in which it is necessary to further suppress oxidization, a reducing atmosphere including approximately several % by volume of a reducing gas such as hydrogen ($H_2$) is preferred.

The firing temperature is preferably in a range of 500° C. to 1000° C., and more preferably in a range of 600° C. to 900° C., and the firing time is in a range of approximately 0.1 hours to 40 hours.

When the firing temperature is set to 500° C. or higher, it is easy to sufficiently carbonize the organic compound. When the firing temperature is set to 1000° C. or lower, Li in the electrode active material is not easily evaporated, and the grain growth of the electrode active material is suppressed. As a result, it is possible to prevent the discharge capacity at a high-speed charge and discharge rate from becoming low, and it is possible to realize sufficient charge and discharge rate performance.

The carbonaceous film is preferably formed on the surfaces of the electrode active material particles through the following steps (1') and (2'). In other words, the electrode material of the present invention is preferably manufactured through the following steps (1') and (2'):

(1') a slurry preparation step of preparing a slurry including the electrode active material particles and/or a precursor of the electrode active material particles, an organic compound i, and an organic compound ii, and (2') a step of drying the slurry so as to generate a granulated body having a film including the organic compounds i and ii on a surface, firing the granulated body in a non-oxidative atmosphere so as to remove the organic compound ii from the film and carbonize the organic compound i, thereby forming a carbonaceous film made of a carbonaceous material coming from the organic compound i on the surface of the granulated body.

In the electrode material obtained through Steps (1') and (2'), it is possible to facilitate the suppression of voltage drop when high-speed charge and discharge (particularly, high-speed discharge in a low-temperature environment) is carried out, and facilitate the setting of "the discharge capacity ratio at −10° C." in the above-described range.

This is considered to be because, in the stage of the formation of the granulated body, the film including the organic compounds i and ii is present on the surface of the granulated body; however, in the firing stage for forming the carbonaceous film, the organic compound ii that is one of the components constituting the film on the granulated body is removed, and thus the number of intervals between the graphene layers constituting the carbonaceous film increases, and the migration of lithium ions becomes easy.

Meanwhile, the organic compound ii is considered to be removed from the film on the granulated body since, in the firing stage, the organic compound ii or the decomposed substance thereof is combusted or evaporated.

For the electrode material obtained through Steps (1') and (2'), it is possible to facilitate the setting of "the powder resistance value" and "the ratio between the powder resistance value and the amount of carbon in the electrode material" in the above-described ranges.

This is considered to be because the organic compound ii or the decomposed substance thereof is combusted, and heat from the combustion increases the degree of crystallinity of the carbonaceous material coming from the organic compound i.

While the specific structure of the carbonaceous film after Step (2') is not clear, the schematic illustration of the structure is considered to look like the state of FIG. 1B.

Meanwhile, the carbonaceous film after Step (2') is made of the carbonaceous material coming from the organic compound i, but the carbonaceous film may include a small amount of a carbonaceous material made of a carbonaceous material coming from the organic compound ii to the extent that the effects of the present invention are not impaired.

The firing in Step (2') is carried out in a non-oxidative atmosphere in which an inert gas and a reducing gas, which is added if necessary, are used, and, in order to facilitate the removal of the organic compound ii, it is preferable to introduce a small amount of combustion-enhancing and/or burnable gases such as oxygen ($O_2$) and lower alcohols. The proportion of the combustion-enhancing and/or burnable gases accounting for the total gas components constituting the non-oxidative atmosphere is preferably in a range of 1.0% by volume to 8.0% by volume, and more preferably in a range of 2.0% by volume to 4.0% by volume.

The firing temperature in Step (2') is preferably in a range of 500° C. to 1000° C., and more preferably in a range of 600° C. to 900° C. In addition, the firing temperature is preferably 100° C. or higher than the thermal decomposition temperature in the non-oxidative atmosphere of the organic compound ii. The firing time is in a range of approximately 0.1 hours to 40 hours.

As the organic compound i, any organic compound can be used without any particular limitation as long as the organic compound is capable of forming the carbonaceous film without being removed from the film on the granulated body through the firing step.

The organic compound i is preferably polyvinyl alcohol (PVA), polyvinyl pyrrolidone, starch, gelatin, hyaluronic acid, sugars such as grape sugar (D-glucose), fruit sugar (D-fructose), sucrose, or lactose, or polyvinyl acetate. The weight-average molecular weight of a macromolecular material is preferably 5000 or more, and more preferably in a range of 8000 to 100000.

As the organic compound ii, any organic compound can be used without any particular limitation as long as the organic compound is removed from the film on the granulated body through the firing step.

Particularly, the organic compound ii is preferably a higher saturated monovalent alcohol such as octanol, nonanol, decanol, or dodecanol, an unsaturated monovalent alcohol such as allyl alcohol, propynol (propargyl alcohol), or terpineol, polyethylene, polypropylene, polybutylene, polyethylene glycol, polypropylene glycol, polybutylene glycol, polyether glycol, polytetramethylene ether glycol, a cellulose such as carboxymethyl cellulose or ethyl cellulose, a plant fiber, fibrin, a chemical fiber, or the like.

When the blending amount of the organic compound i in the slurry is set to 100 parts by mass, the blending amount of the organic compound ii is preferably set in a range of 5 parts by mass to 100 parts by mass, more preferably set in a range of 10 parts by mass to 80 parts by mass, and still more preferably set in a range of 15 parts by mass to 60 parts by mass. When the blending amount is set in the above-described range, it is possible to facilitate the setting of "the discharge capacity ratio at −10° C.", "the powder resistance value", and "the ratio between the powder resistance value and the amount of carbon in the electrode material" in the above-described ranges.

Paste for Electrodes

The paste for electrodes in the present invention includes the electrode material of the present invention and a binding agent.

As the binding agent, for example, a macromolecular resin such as a polytetrafluoroethylene (PTFE) resin, a polyvinylidene fluoride (PVdF) resin, or fluororubber is preferably used.

The blending ratio of the binding agent to the electrode material is not particularly limited, and, for example, the amount of the binding agent blended is preferably in a range of 1 part by mass to 30 parts by mass, and more preferably in a range of 3 parts by mass to 20 parts by mass with respect to 100 parts by mass of the electrode material.

The paste for electrodes preferably further includes a solvent and a conductive auxiliary agent.

The solvent used for paint for electrode formation or paste for electrode formation may be appropriately selected in accordance with the properties of the binder resin.

Examples thereof include water; alcohols such as methanol, ethanol, 1-propanol, 2-propanol (isopropyl alcohol: IPA), butanol, pentanol, hexanol, octanol, and diacetone alcohol; esters such as ethyl acetate, butyl acetate, ethyl lactate, propylene glycol monomethyl ether acetate, propylene glycol monoethyl ether acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone (MEK), methyl isobutyl ketone (MIBK), acetylacetone, and cyclohexanone; amides such as dimethyl formamide, N,N-dimethyl acetamide, and N-methyl pyrrolidone; glycols such as ethylene glycol, diethylene glycol, and propylene glycol; and the like. These solvents may be singly used, or a mixture of two or more solvents may be used.

Electrode and Lithium Ion Battery

An electrode of the present invention can be obtained by applying the paste for electrodes in the present invention to one surface of a metal foil, and drying the paste so as to form a coated film, and then bonding the coated film by pressing so as to produce an electrode material layer.

Through the above-described steps, the electrode having excellent output characteristics can be produced. The electrode is useful as positive electrodes for lithium ion batteries.

In addition, a lithium ion battery of the present invention includes a positive electrode collector having the electrode material layer formed of the paste for electrodes of the present embodiment on a metal foil.

In the electrode and lithium ion battery of the present invention, the internal resistance of the electrode can be decreased by producing the electrode using the electrode material of the present invention. Therefore, it is possible to suppress the internal resistance of the battery at a low level, and consequently, it is possible to provide a lithium ion battery capable of carrying out high-speed charge and discharge without any concern of a significant voltage drop.

In the lithium ion battery of the present invention, there is no particular limitation regarding the negative electrode, an electrolytic solution, a separator, and the like. For example, for the negative electrode, it is possible to use a negative electrode material such as Li metal, a carbon material, a Li alloy, or $Li_4Ti_5O_{12}$. In addition, a solid electrolyte may be used in place of the electrolytic solution and the separator.

EXAMPLES

Next, the present invention will be described in more detail using the examples, but the present invention is not limited by the examples.

1. Measurement

The following measurements were carried out on electrode materials of examples and comparative examples. The results are described in Tables 1 to 3.

Figure 2:
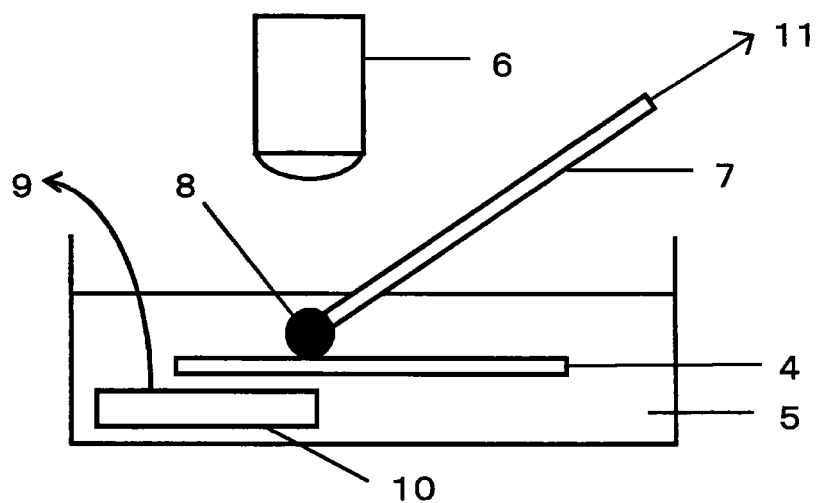
FIG. 2 is a view illustrating an outline of a system for measuring an electrochemical response of a single particle of the electrode material.

(1) Discharge Capacity and Discharge Capacity Ratio of Single Particle of Electrode Material An electrode material was scattered on a glass separator 4, and then the separator was fixed in an electrolytic solution 5 in a cell. The cell was placed in a microscope, and the front end of a probe 7 and a single particle 8 of the electrode material were brought into contact with each other by operating a micro manipulator while watching an image of a CCD camera 6 mounted in the microscope. When an electric contact was obtained, the discharge capacity was measured under four conditions (1C at −10° C., 35C at −10° C., 1C at 20° C., and 35C at 20° C.). For the respective electrode materials, the discharge capacities of 100 single particles were measured, and the average of the discharge capacity ratio at −10° C. and the discharge capacity ratio at 20° C. was calculated. A reference electrode 9 was a lithium foil 10 (1 cm²) bonded to a nickel mesh by pressure. Since a microelectrode has a weak current value, the measurement was carried out in a two-electrode mode. As the electrolytic solution, a solvent mixture of propylene carbonate and ethylene carbonate (at a volume ratio of 3:7) including 1.0 $mol/dm^3$ of $LiPF_6$ was used. A schematic view of the cell used in the measurement is illustrated in FIG. 2.

(2) Inflection Ratio

The inflection ratio of the migration path of lithium ions in the carbonaceous film in the electrode material was calculated under the following conditions.

Computation of Film Thickness

First, the film thickness of the carbonaceous film on a single electrode active material particle in the electrode material was calculated using a transmission electron microscope. Specifically, a normal line was drawn at an arbitrary position on the surface of the electrode active material particle, and the interval between the intersection point of the normal line and the surface of the active material particle and the intersection point of the normal line and the surface of the carbonaceous film was considered as the film thickness of the carbonaceous film at the position.

Computation of Migration Path of Lithium Ions

After the film thickness was calculated, the migration path of lithium ions between the two intersection points was calculated. The shortest distance of lithium ions migrating between the two intersection points was considered as the migration path of lithium ions. When the migration path of lithium ions was calculated, the fact that "lithium ions are incapable of passing through a structure in which electrons are delocalized such as graphene, and thus are forced to bypass the graphene" and the fact that "lithium ions are forced to bypass steric hindrances generated by carbon atoms and/or a chain-shaped or cyclic structured substance including carbon atoms" were taken into account.

Computation of Inflection Ratio of Lithium Ions

The above-described processes (the computation of the film thickness and the computation of the migration path) were carried out at 10 positions in each of 10 single particles (a total of 100 positions). The inflection ratios of lithium ions at a total of 100 positions were calculated using the formula [1] described below, and the average value thereof was considered as the inflection ratio of each electrode material.

The inflection ratio of lithium ions=[the distance of the migration path of lithium ions/the film thickness of the carbonaceous film]  Formula [1]

(3) Amount of Carbon

The amount (% by mass) of carbon in the electrode material was measured using a carbon analyzer.

(4) Powder Resistance Value

The electrode material was injected into a mold, and was molded at a pressure of 50 MPa, thereby producing a specimen. The powder resistance value (Ω·cm) of the specimen was measured using a low resistivity meter (manufactured by Mitsubishi Chemical Corporation, trade name: Loresta-GP) through a four point measurements method at 25° C.

(5) Average Particle Diameter (D50)

The average particle diameter (D50) of the electrode material was measured using a laser diffraction-type particle size distribution measurement instrument (manufactured by Shimadzu Corporation, trade name: SALD-1000).

(6) Specific Surface Area

The specific surface area of the electrode material was measured using a specific surface area meter (manufactured by BEL Japan, Inc., trade name: BELSORP-mini) and a BET method in which the adsorption of nitrogen ($N_2$) was used.

(7) Coating Proportion by the Carbonaceous Film

The carbonaceous film in the electrode material was observed using a transmission electron microscope (TEM) and an energy-dispersive X-ray spectroscope (EDX), and the proportion of portions coated with the carbonaceous film in the surface of the electrode material was calculated, and was considered as the coating proportion.

(8) Thickness of the Carbonaceous Film

The film thickness of the carbonaceous film at 10 arbitrary positions on a single electrode active material particle in the electrode material was calculated using a transmission electron microscope, and the average of the thicknesses at the 10 positions was calculated. The processes were carried in each of 10 particles, and the average value thereof was considered as the thickness of the carbonaceous film.

(9) The XRD (CuKα Ray Source) Peak Derived from the Graphene Layer in the Carbonaceous Film and the Average of the Plane Intervals Between the Graphene Layers in the Carbonaceous Film An XRD (CuKα ray source) measurement was carried out under the following conditions using an X'Pert PRO MPS (trade name, manufactured by PANalytical), and thus the peaks of the (002) planes of the graphene layers were measured. In addition, the plane intervals between the (002) planes in the respective graphene layers were calculated using Bragg's equation by profile-fitting the obtained peaks, and furthermore, the average value of the plane intervals was calculated.

(Ray source: CuKα ray source, scan speed: 0.01°/s, scan step: 0.01°, and measurement range: 2θ=15° to 30°)

2. Production of the Electrode Material

Example 1

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 1.5 g of sucrose and 0.075 g of allyl alcohol in 100 g of water and 100 g of the precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 1, the amount of allyl alcohol (organic compound ii) was 5 parts by mass with respect to 100 parts by mass of sucrose (organic compound i).

Next, the slurry on which the dispersion treatment had been carried out was sprayed and dried in the atmosphere at 180° C., thereby obtaining a granulated body having a film including sucrose and allyl alcohol on the surface.

Next, the obtained granulated body was fired at 700° C. for 0.1 hours in a non-oxidative atmosphere (100% by volume of nitrogen and 0% by volume of oxygen) so as to remove allyl alcohol from the film and carbonize sucrose, thereby obtaining an electrode material having a carbonaceous film formed on the surface of a carbonaceous film made of $LiFePO_4$ having an olivine-type crystal structure.

Example 2

An electrode material was obtained in the same manner as in Example 1 except for the fact that the amount of allyl alcohol added to produce a slurry was changed to 0.3 g. Regarding the content of the organic compound in the slurry of Example 2, the amount of allyl alcohol (organic compound ii) was 20 parts by mass with respect to 100 parts by mass of sucrose (organic compound i).

Example 3

An electrode material was obtained in the same manner as in Example 1 except for the fact that the amount of allyl alcohol added to produce a slurry was changed to 0.75 g. Regarding the content of the organic compound in the slurry of Example 3, the amount of allyl alcohol (organic compound ii) was 50 parts by mass with respect to 100 parts by mass of sucrose (organic compound i).

Example 4

An electrode material was obtained in the same manner as in Example 1 except for the fact that the amount of allyl alcohol added to produce a slurry was changed to 1.2 g. Regarding the content of the organic compound in the slurry of Example 4, the amount of allyl alcohol (organic compound ii) was 80 parts by mass with respect to 100 parts by mass of sucrose (organic compound i).

Example 5

An electrode material was obtained in the same manner as in Example 1 except for the fact that the amount of allyl alcohol added to produce a slurry was changed to 1.5 g. Regarding the content of the organic compound in the slurry of Example 5, the amount of allyl alcohol (organic compound ii) was 100 parts by mass with respect to 100 parts by mass of sucrose (organic compound i).

Example 6

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 3.0 g of lactose and 0.15 g of polypropylene in 100 g of water and 100 g of the precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 6, the amount of polypropylene (organic compound ii) was 5 parts by mass with respect to 100 parts by mass of lactose (organic compound i).

Next, the slurry on which the dispersion treatment had been carried out was sprayed and dried in the atmosphere at 180° C., thereby obtaining a granulated body having a film including lactose and polypropylene on the surface.

Next, the obtained granulated body was fired at 700° C. for 10 hours in a non-oxidative atmosphere (98% by volume of nitrogen and 2% by volume of oxygen) so as to remove polypropylene from the film and carbonize lactose, thereby obtaining an electrode material having a carbonaceous film formed on the surface of an electrode active material made of $LiFePO_4$ having an olivine-type crystal structure.

Example 7

An electrode material was obtained in the same manner as in Example 6 except for the fact that the amount of polypropylene added to produce a slurry was changed to 0.6 g. Regarding the content of the organic compound in the slurry of Example 7, the amount of polypropylene (organic compound ii) was 20 parts by mass with respect to 100 parts by mass of lactose (organic compound i).

Example 8

An electrode material was obtained in the same manner as in Example 6 except for the fact that the amount of polypropylene added to produce a slurry was changed to 1.5 g. Regarding the content of the organic compound in the slurry of Example 8, the amount of polypropylene (organic compound ii) was 50 parts by mass with respect to 100 parts by mass of lactose (organic compound i).

Example 9

An electrode material was obtained in the same manner as in Example 6 except for the fact that the amount of polypropylene added to produce a slurry was changed to 2.4 g. Regarding the content of the organic compound in the slurry of Example 9, the amount of polypropylene (organic compound ii) was 80 parts by mass with respect to 100 parts by mass of lactose (organic compound i).

Example 10

An electrode material was obtained in the same manner as in Example 6 except for the fact that the amount of polypropylene added to produce a slurry was changed to 3.0 g. Regarding the content of the organic compound in the slurry of Example 10, the amount of polypropylene (organic compound ii) was 100 parts by mass with respect to 100 parts by mass of lactose (organic compound i).

Example 11

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 6.0 g of polyvinyl alcohol and 3.0 g of terpineol in 100 g of water and 100 g of a precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 11, the amount of terpineol (organic compound ii) was 50 parts by mass with respect to 100 parts by mass of polyvinyl alcohol (organic compound i).

Next, the slurry on which the dispersion treatment had been carried out was sprayed and dried in the atmosphere at 180° C., thereby obtaining a granulated body having a film including polyvinyl alcohol and terpineol on the surface.

Next, the obtained granulated body was fired at 700° C. for 20 hours in a non-oxidative atmosphere (98% by volume of nitrogen, 1% by volume of hydrogen, and 1% by volume of oxygen) so as to remove terpineol from the film and carbonize polyvinyl alcohol, thereby obtaining an electrode material having a carbonaceous film formed on the surface of an electrode active material made of $LiFePO_4$ having an olivine-type crystal structure.

Example 12

An electrode material was obtained in the same manner as in Example 11 except for the fact that the organic compound i used to produce a slurry was changed to grape sugar.

Regarding the content of the organic compound in the slurry of Example 12, the amount of terpineol (organic compound ii) was 50 parts by mass with respect to 100 parts by mass of grape sugar (organic compound i).

Example 13

An electrode material was obtained in the same manner as in Example 11 except for the fact that the organic compound i used to produce a slurry was changed to polyvinyl pyrrolidone. Regarding the content of the organic compound in the slurry of Example 13, the amount of terpineol (organic compound ii) was 50 parts by mass with respect to 100 parts by mass of polyvinyl pyrrolidone (organic compound i).

Example 14

An electrode material was obtained in the same manner as in Example 11 except for the fact that the organic compound ii used to produce a slurry was changed to polyethylene glycol. Regarding the content of the organic compound in the slurry of Example 14, the amount of polyethylene glycol (organic compound ii) was 50 parts by mass with respect to 100 parts by mass of polyvinyl alcohol (organic compound i).

Example 15

An electrode material was obtained in the same manner as in Example 11 except for the fact that the organic compound ii used to produce a slurry was changed to carboxymethyl cellulose. Regarding the content of the organic compound in the slurry of Example 15, the amount of carboxymethyl cellulose (organic compound ii) was 50 parts by mass with respect to 100 parts by mass of polyvinyl alcohol (organic compound i).

Example 16

4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture. Next, the mixture was accommodated in a pressure-resistant airtight container having a capacity of 8 L, and was hydrothermally synthesized for 1 hour at 200° C. Next, the obtained sediment was washed using water, thereby obtaining a cake-form precursor of an electrode active material.

Next, an aqueous solution obtained by dissolving 8.0 g of fruit sugar and 8.0 g of hydroxyethyl cellulose in 100 g of water and 100 g of the precursor of the electrode active material (in terms of the solid content) were mixed so as to produce a slurry, and a dispersion treatment was carried out on the slurry using a binary fluid-type wet jet crusher so that the average particle diameter (D50) of the primary particles of precursor particles of the electrode active material in the slurry reached 50 nm. Regarding the content of the organic compound in the slurry of Example 16, the amount of hydroxyethyl cellulose (organic compound ii) was 100 parts by mass with respect to 100 parts by mass of fruit sugar (organic compound i).

Next, the slurry on which the dispersion treatment had been carried out was sprayed and dried in the atmosphere at 180° C., thereby obtaining a granulated body having a film including fruit sugar and hydroxyethyl cellulose on the surface.

Next, the obtained granulated body was fired at 700° C. for 40 hours in a non-oxidative atmosphere (95% by volume of nitrogen, 3% by volume of hydrogen, and 2% by volume of oxygen) so as to remove hydroxyethyl cellulose from the film and carbonize fruit sugar, thereby obtaining an electrode material having a carbonaceous film formed on the surface of an electrode active material made of $LiFePO_4$ having an olivine-type crystal structure.

Example 17

An electrode material was obtained in the same manner as in Example 16 except for the fact that the organic compound i used to produce a slurry was changed to polyvinyl pyrrolidone. Regarding the content of the organic compound in the slurry of Example 17, the amount of hydroxyethyl cellulose (organic compound ii) was 100 parts by mass with respect to 100 parts by mass of polyvinyl pyrrolidone (organic compound i).

Example 18

An electrode material was obtained in the same manner as in Example 16 except for the fact that the organic compound i used to produce a slurry was changed to lactose. Regarding the content of the organic compound in the slurry of Example 18, the amount of hydroxyethyl cellulose (organic compound ii) was 100 parts by mass with respect to 100 parts by mass of lactose (organic compound i).

Example 19

An electrode material was obtained in the same manner as in Example 16 except for the fact that the organic compound ii used to produce a slurry was changed to allyl alcohol. Regarding the content of the organic compound in the slurry of Example 19, the amount of allyl alcohol (organic compound ii) was 100 parts by mass with respect to 100 parts by mass of fruit sugar (organic compound i).

Example 20

An electrode material was obtained in the same manner as in Example 16 except for the fact that the organic compound ii used to produce a slurry was changed to polypropylene. Regarding the content of the organic compound in the slurry of Example 20, the amount of polypropylene (organic compound ii) was 100 parts by mass with respect to 100 parts by mass of fruit sugar (organic compound i).

Comparative Example 1

An electrode material was obtained in the same manner as in Example 1 except for the fact that the organic compound ii used to produce a slurry was not added.

Comparative Example 2

An electrode material was obtained in the same manner as in Example 6 except for the fact that the organic compound ii used to produce a slurry was not added.

Comparative Example 3

An electrode material was obtained in the same manner as in Example 11 except for the fact that the organic compound ii used to produce a slurry was not added.

Comparative Example 4

An electrode material was obtained in the same manner as in Example 16 except for the fact that the organic compound ii used to produce a slurry was not added.

3. Production of Slurries for Electrodes and Electrodes

The electrode material, a binder resin (polyvinylidene fluoride), and a conductive auxiliary agent (acetylene black) were mixed so that the mass ratio reached 90:5:5, and furthermore, N-methyl-2-pyrrolidone (NMP) was added as a solvent so as to impart fluidity, thereby producing a slurry for electrodes.

Next, the slurry for electrodes was applied onto a 15 μm-thick aluminum (Al) foil, and was dried. After that, the slurry was pressurized at a pressure of 600 kgf/cm$^2$, thereby producing a positive electrode of a lithium ion battery.

4. Production of an Electrode

Lithium metal was disposed as a negative electrode against the positive electrode of the lithium ion battery, and a separator made of porous polypropylene was disposed between the positive electrode and the negative electrode, thereby producing a battery member.

Meanwhile, ethylene carbonate and diethyl carbonate were mixed together in (a mass ratio of) 1:1, and furthermore 1 M of a LiPF$_6$ solution was added, thereby producing an electrolyte solution having lithium ion conductivity.

Next, the battery member was immersed in the electrolyte solution, thereby producing the lithium ion battery.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Content (parts by mass) of organic compound ii with respect to 100 parts by mass of organic compound i | 5 | 20 | 50 | 80 | 100 | 5 | 20 | 50 | 80 | 100 |
| Inflection ratio (%) | 94 | 76 | 55 | 32 | 16 | 78 | 56 | 38 | 6 | 2 |
| XRD peak of (002) plane (°) | 25.1 | 24.9 | 24.7 | 24.6 | 24.2 | 25.7 | 25.0 | 24.8 | 24.4 | 24.3 |
| Plane intervals between graphene layers (nm) | 0.3548 | 0.3576 | 0.3604 | 0.3619 | 0.3678 | 0.3466 | 0.3562 | 0.3590 | 0.3648 | 0.3663 |
| Amount of carbon (% by mass) | 0.8 | 0.8 | 0.9 | 1 | 1.2 | 0.8 | 0.8 | 0.8 | 0.9 | 1 |
| Powder resistance value (Ω · cm) | 240 | 234 | 224 | 238 | 241 | 154 | 163 | 151 | 143 | 140 |
| Average particle diameter (μm) | 20 | 23 | 21 | 25 | 18 | 22 | 24 | 15 | 17 | 20 |
| Specific surface area (m$^2$/g) | 9.81 | 9.92 | 9.84 | 10.31 | 10.26 | 10.64 | 10.51 | 10.63 | 10.94 | 10.53 |
| Thickness of carbonaceous film (nm) | 3.3 | 3.7 | 3.8 | 4.0 | 5.0 | 2.8 | 3.1 | 3.3 | 3.4 | 4.8 |
| Coating proportion (%) | 85 | 87 | 87 | 90 | 89 | 89 | 91 | 87 | 93 | 95 |
| Powder resistance/amount of carbon | 300 | 293 | 249 | 238 | 201 | 193 | 204 | 189 | 159 | 140 |
| Discharge capacity ratio (35 C/1 C) −10° C. | 0.53 | 0.66 | 0.70 | 0.72 | 0.71 | 0.55 | 0.64 | 0.71 | 0.70 | 0.70 |
| Discharge capacity ratio (35 C/1 C) 20° C. | 0.70 | 0.81 | 0.85 | 0.83 | 0.84 | 0.74 | 0.77 | 0.84 | 0.86 | 0.85 |

TABLE 2

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Content (parts by mass) of organic compound ii with respect to 100 parts by mass of organic compound i | 50 | 50 | 50 | 50 | 50 | 100 | 100 | 100 | 100 | 100 |
| Inflection ratio (%) | 46 | 63 | 51 | 47 | 78 | 68 | 61 | 54 | 42 | 51 |
| XRD peak of (002) plane (°) | 24.6 | 24.5 | 24.5 | 24.7 | 24.6 | 24.4 | 24.3 | 24.5 | 24.4 | 24.8 |
| Plane intervals between graphene layers (nm) | 0.3619 | 0.3633 | 0.3633 | 0.3604 | 0.3619 | 0.3648 | 0.3663 | 0.3633 | 0.3648 | 0.3590 |
| Amount of carbon (% by mass) | 1.6 | 2.2 | 3.4 | 1.8 | 1.7 | 4.1 | 3.5 | 4.3 | 4.4 | 4.1 |
| Powder resistance value (Ω · cm) | 128 | 113 | 15 | 134 | 110 | 17 | 13 | 8 | 11 | 15 |
| Average particle diameter (μm) | 11 | 14 | 24 | 21 | 18 | 31 | 27 | 14 | 18 | 25 |
| Specific surface area (m$^2$/g) | 12.41 | 13.37 | 14.58 | 13.16 | 13.54 | 16.87 | 15.57 | 16.62 | 16.44 | 16.18 |

TABLE 2-continued

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Thickness of carbonaceous film (nm) | | 2.4 | 2.6 | 2.4 | 2.2 | 3.0 | 2.5 | 2.7 | 2.2 | 2.1 | 2.5 |
| Coating proportion (%) | | 92 | 94 | 95 | 93 | 94 | 95 | 91 | 93 | 99 | 95 |
| Powder resistance/amount of carbon | | 80 | 51 | 4 | 74 | 65 | 4 | 4 | 2 | 3 | 4 |
| Discharge capacity ratio (35 C/1 C) | −10° C. | 0.65 | 0.61 | 0.55 | 0.67 | 0.70 | 0.65 | 0.52 | 0.51 | 0.55 | 0.53 |
| | 20° C. | 0.81 | 0.75 | 0.67 | 0.81 | 0.82 | 0.78 | 0.74 | 0.70 | 0.74 | 0.75 |

TABLE 3

|  |  | Comparative Example 1 | Comparative Example 2 | Comparative Example 3 | Comparative Example 4 |
|---|---|---|---|---|---|
| Content (parts by mass) of organic compound ii with respect to 100 parts by mass of organic compound i | | 0 | 0 | 0 | 0 |
| Inflection ratio (%) | | 181 | 164 | 105 | 112 |
| XRD peak of (002) plane (°) | | 26.0 | 25.8 | 25.9 | 26.1 |
| Plane intervals between graphene layers (nm) | | 0.3427 | 0.3453 | 0.3440 | 0.3414 |
| Amount of carbon (% by mass) | | 0.4 | 0.5 | 1.5 | 3.8 |
| Powder resistance value (Ω · cm) | | 1142 | 382 | 98 | 12 |
| Average particle diameter (μm) | | 22 | 25 | 18 | 28 |
| Specific surface area (m²/g) | | 9.78 | 11.5 | 112.16 | 15.49 |
| Thickness of carbonaceous film (nm) | | 0.4 | 0.4 | 0.4 | 0.3 |
| Coating proportion (%) | | 85 | 92 | 90 | 93 |
| Powder resistance/amount of carbon | | 2855 | 764 | 65 | 3 |
| Discharge capacity ratio (35C/1C) | −10° C. | 0.24 | 0.38 | 0.26 | 0.31 |
| | 20° C. | 0.44 | 0.48 | 0.45 | 0.46 |

INDUSTRIAL APPLICABILITY

The present invention is available for electrode materials used as positive electrode materials for batteries, and furthermore, positive electrode materials for lithium ion batteries, electrodes including the electrode material, and lithium ion batteries including a positive electrode made of the electrode.

DESCRIPTION OF REFERENCE NUMERALS AND SIGNS

1: ELECTRODE ACTIVE MATERIAL PARTICLES
2: CARBONACEOUS FILM
3: LITHIUM ION
4: GLASS SEPARATOR
5: ELECTROLYTIC SOLUTION
6: CCD CAMERA
7: PROBE
8: SINGLE PARTICLE OF ELECTRODE MATERIAL
9: REFERENCE ELECTRODE
10: LITHIUM FOIL
11: ACTION ELECTRODE

The invention claimed is:

1. An electrode material, comprising:
electrode active material particles and a carbonaceous film provided on surfaces of the electrode active material particles, wherein the electrode active material particles having the carbonaceous film provided thereon form an electrode material having a particulate shape;
wherein an average of discharge capacity ratios between a 3C discharge capacity at −10° C. of a single particle of the electrode material and a 1C discharge capacity at −10° C. of a single particle of the electrode material is 0.50 or more,
an XRD (CuKα ray source) peak of the (002) plane derived from graphene layers in the carbonaceous film is 2Θ=25.7° or less, and
an average of plane intervals between (002) planes in the graphene layers is 0.3466 nm or more.

2. The electrode material according to claim 1, wherein an inflection ratio of a lithium ion migration path in the carbonaceous film is in a range of 1.1 to 100.

3. The electrode material according to claim 1, wherein the electrode active material particles have an olivine-type crystal structure.

4. The electrode material according to claim 1, wherein a content rate of the carbonaceous film with respect to a total mass of the electrode material is in a range of 0.5% by mass to 5.0% by mass.

5. The electrode material according to claim 1, wherein a powder resistance value of the electrode material is 300 Ω·cm or less.

6. The electrode material according to claim 1, wherein a ratio between a powder resistance value (Ω·cm) of the electrode active material particles and a content rate (% by mass) of the carbonaceous film is 300 or less.

7. The electrode material according to claim 1,
wherein the electrode material is produced by the following steps (1) and (2),
(1) a slurry preparation step of preparing a slurry including the electrode active material particles and/or a precursor of the electrode active material particles, an organic compound i, and an organic compound ii, and
(2) a step of drying the slurry so as to generate a granulated body having a film including the organic compounds i and ii on a surface, firing the granulated body in a non-oxidative atmosphere so as to remove the organic compound ii from the film and carbonize the organic compound i, thereby forming a carbonaceous film made of a carbonaceous material coming from the organic compound i on the surface of the granulated body.

8. The electrode material according to claim 1,
wherein the XRD (CuKα ray source) peak of the (002) plane derived from graphene layers in the carbonaceous film is 2Θ=25.4° to 24.0°.

9. The electrode material according to claim 1,
wherein the average of the plane intervals between (002) planes in the graphene layers is 0.350 nm to 0.370 nm.

10. The electrode material according to claim 1,
wherein an average thickness of the carbonaceous film is 0.5 nm to 20 nm.

11. The electrode material according to claim 1,
wherein the average of discharge capacity ratios between a 3C discharge capacity at −10° C. of a single particle of the electrode material and a 1C discharge capacity at −10° C. of a single particle of the electrode material is 0.60 or more.

12. The electrode material according to claim 1,
wherein the average of discharge capacity ratios between a 3C discharge capacity at −10° C. of a single particle of the electrode material and a 1C discharge capacity at −10° C. of a single particle of the electrode material is in a range of 0.65 to 0.90.

13. The electrode material according to claim 1,
wherein an inflection ratio of a lithium ion migration path in the carbonaceous film is in a range of 1.3 to 50.

14. The electrode material according to claim 1,
wherein an inflection ratio of a lithium ion migration path in the carbonaceous film is in a range of 1.5 to 10.

15. The electrode material according to claim 1,
wherein an average thickness of the carbonaceous film is 1 nm to 10 nm.

16. The electrode material according to claim 1,
wherein an average thickness of the carbonaceous film is 1 nm to 5 nm.

17. The electrode material according to claim 1,
wherein a coating proportion of the surface of the electrode material particles with the carbonaceous film is at least 50%.

18. The electrode material according to claim 1,
wherein a coating proportion of the surface of the electrode material particles with the carbonaceous film is at least 80%.

19. Paste for electrodes comprising: the electrode material according to claim 1 and a binding agent.

20. A lithium ion battery comprising:
a positive electrode collector having an electrode material layer formed of the paste for electrodes according to claim 19 on a metal foil.

* * * * *